Sept. 9, 1952           C. L. KITE           2,609,784
UNDERINFLATION DUAL TIRE ALARM
Filed April 9, 1949
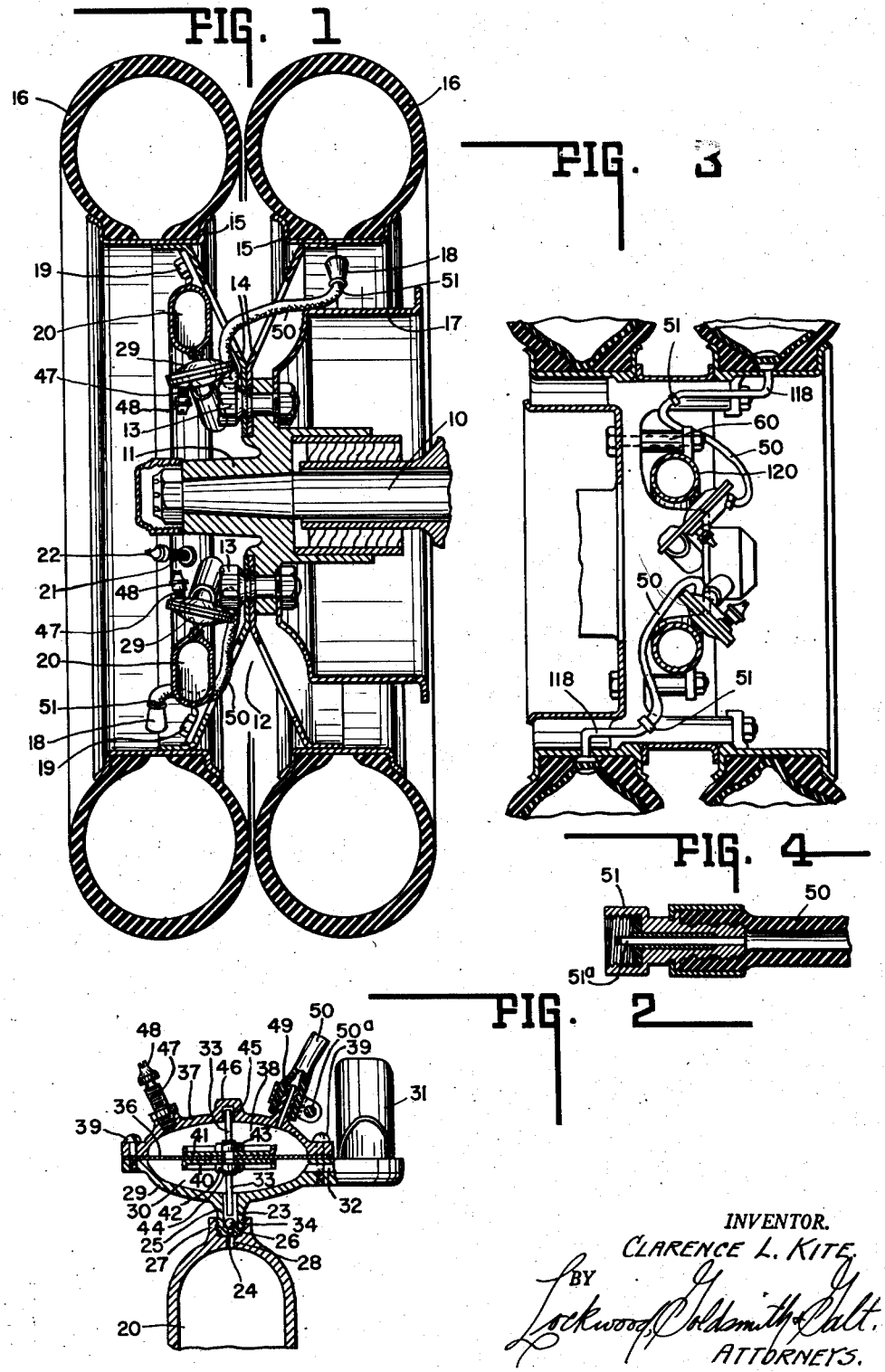

Patented Sept. 9, 1952

2,609,784

UNITED STATES PATENT OFFICE 2,609,784

UNDERINFLATION DUAL TIRE ALARM

Clarence L. Kite, Radnor, Ind.

Application April 9, 1949, Serial No. 86,553

2 Claims. (Cl. 116—34)

This invention relates to an alarm device for dual tires.

The chief object of the present invention is to provide a singular device for attachment to a dual wheel structure and which is utilizable with both tires to warn the vehicle operator whenever either tire reaches a predetermined degree of deflation.

The chief feature of the present invention resides in applying to a dual wheel structure a fluid pressure reservoir and operatively associating therewith a warning device for each tire, said device being operatively associated with the air supply valve structure of that tire.

The present invention is predicated upon operation of the deflation indicator through differential pressures residual in the fluid pressure reservoir and tire.

Other objects and features of the invention will be set forth more fully hereinafter.

The full nature of the invention will be understood from the accompanying drawings and the following description and claims.

In the drawings, Fig. 1 is a central sectional view through a dual wheel structure with the invention applied thereto.

Fig. 2 is a central sectional view through one of the indicator units and a portion of that reservoir, the signal per se, of audible type being shown in elevation.

Fig. 3 is a central sectional view through a slightly modified form of the invention.

Fig. 4 is a longitudinal enlarged sectional view through a connection structure.

In Fig. 1 the axle 10 supports a hub 11 of a dual wheel structure 12 detachably mounting as at 13, the body portions 14 that carry rims 15, each of which mounts a tire 16. Hub 11 also mounts brake drum 17. All the foregoing comprises an example of a conventional dual wheel structure to which the invention is applied.

Each tire 16 includes an air-fill supply 18 that projects through rim 15 as shown. This also is conventional. However, in the present invention the usual valve stem cap is omitted.

Detachably or otherwise mounted as at 19 is a fluid pressure reservoir 20 in the form of an annulus. This preferably, but not necessarily, is metallic. It includes a single air-fill structure 21 with included valve core or insides, not shown, and a cap 22.

Reference will now be had to Fig. 2 wherein there is illustrated one of the two signal indicators used with the dual wheel structure. If a triple wheel structure be utilized, three signal indicators would be used. Herein, see Fig. 1 the two indicators are disposed in diametral or balanced relation. If three indicators be used same would be disposed 120 degrees apart for balanced disposition.

Each indicator, see Fig. 2 includes a stem 23 ported as at 24 and this is enlarged to form tube 25 with valve seat 26 therebetween. The exterior of the stem is threaded for rigid connection in portion 27 on the reservoir 20, said portion 27 having channel 28 therethrough.

Stem 23 is integral with housing portion 29 which is dished to form chamber 30. Carried by the housing in off-set relation is an audible signal 31 which by passage 32, communicates with chamber 30. A stem or pin 33 disposed in tube 25 normally constrains ball valve 34 to seat 26 to prevent air escape from the reservoir 20 to chamber 30 to blow the whistle, thus actuating the audible alarm herein selected for illustration.

Closing chamber 30 is diaphragm 36. This is secured by dished cover 37 providing chamber 38. The cover 37 and housing 29 are suitably secured together with the diaphragm 36 therebetween as at 39. The diaphragm includes reenforcing disc 40 in chamber 30 and a reversely disposed similar disc 41 in chamber 38. Nuts 42 and 43 respectively clamp same together with the diaphragm therebetween. Stem 33 is threaded at 44 for such purpose.

Stem 33 also, as shown, extends across chamber 38 and its free end terminates in channel 45 in boss 46. Thus as the diaphragm 36 flexes the stem 33 reciprocates and ball valve 34 seats and unseats correspondingly.

Cover cap 37 mounts an air-fill device 47 including a valve or insides not shown, and the device mounts valve cap 48. Cover cap 37 also includes hose mount 49 and a hose 50 is clampingly secured thereto at one end as at 50ª. The other end of the hose 50 terminates in a screw type leak-proof connector 51, see Fig. 1 having threaded connection with the tire air-fill portion 18. Such connection is illustrated in detail in Fig. 4. It includes stem 51ª that is arranged to hold the tire valve insides in open position.

The operation is as follows: Each tire is inflated to the desired pressure through air-fill device 47, chamber 38 and hose 50. Thus chamber 38 is always at the same pressure as its connected tire. Normally this pressure is below that carried in the reservoir. The ball valve 34 is always normally constrained to its seat because the reservoir high pressure times the small ball area, is normally less than the tire pressure times the diaphragm area. The ball valve 34 prevents reservoir pressure escape and hence prevents alarm actuation.

Whenever through a leak, puncture or blowout, the pressure in chamber 38 falls to a predetermined degree below the desired pressure, the reservoir pressure can now, through ball 34 and stem 33, flex the diaphragm into the chamber 38. In so doing reservoir air pressure escapes to chamber 30 for signal actuation. This continues until the effective pressures in the two chambers substantially balance. Chamber 30 of course is normally at atmospheric pressure. As deflation continues the alarm is actuated until the reservoir pressure supply is exhausted.

Note that spare tires are inflated and held in that condition by the usual cap and stem valve. When a deflated tire is removed and the spare is applied it is connected to the warning device in an operative manner, in other words the hose 50 is connected to the spare tire stem from which the cap only is removed.

In Fig. 3 a similar embodiment of the invention is illustrated. Herein a heavy duty dual truck wheel is illustrated and spacers (sleeves) 60 are utilized to mount the annular reservoir 120, herein shown circular in radial section. Also the tire stems 118 are elongated and angular and to the same is attached the couplings 51 of tubes 50 as shown. The remainder of the invention is the same as before.

This invention accordingly is directed to a device that can be readily mounted on a wheel and if desired it can lay against the tire head. This device permits any pressure to be carried in either tire. The alarm however, is actuated at the same predetermined pressure for all tires connected to the air reservoir. This invention also permits the pressure of each tire to be checked, etc.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A multiple tire, under inflation, indicating device comprising a single pressure fluid reservoir, a plurality of warning signals, one for each tire and each operated by pressure from said reservoir, a like number of controls, one for each signal, each control being subject to reservoir pressure, a pressure chamber for each control in free communication with the associated tire and having a pressure therein equal to that tire pressure, a valve controlled air supply inlet common to the tire and the said chamber, and means in each chamber sealing the tire pressure chamber from the reservoir pressure chamber responsive to chamber and tire pressures and normally constraining said control in opposition to reservoir pressure, to prevent signal actuation until a predetermined degree of tire deflation occurs to insure reservoir pressure actuation of said control.

2. A device as defined by claim 1 wherein the control, comprising a casing having a diaphragm therein dividing the casing into a chamber connected with a tire and having an air supply inlet and a second chamber having a signal operated by pressure therein and supplied with air from the reservoir.

CLARENCE L. KITE.

REFERENCES CITED

The following references are of record in the file of this patent:

UNITED STATES PATENTS

| Number | Name | Date |
|---|---|---|
| 1,673,883 | Potestio | June 19, 1928 |
| 2,411,285 | Miller | Nov. 19, 1946 |